United States Patent [19]
Herbert

[11] 3,872,833
[45] Mar. 25, 1975

[54] DOG COLLAR
[76] Inventor: Earl Herbert, 2428 S. Twelfth St., St. Joseph, Mo. 64505
[22] Filed: Jan. 28, 1974
[21] Appl. No.: 437,316

[52] U.S. Cl. .............................................. 119/106
[51] Int. Cl. ............................................ A01k 27/00
[58] Field of Search ............................ 119/106, 109

[56] References Cited
UNITED STATES PATENTS
2,859,732  11/1958  Driscoll.............................. 119/106
FOREIGN PATENTS OR APPLICATIONS
838,093  6/1960  United Kingdom
609,416  11/1960  Canada

*Primary Examiner*—Hugh R. Chamblee
*Attorney, Agent, or Firm*—John A. Hamilton

[57] ABSTRACT

A dog collar adapted to be used either as a standard collar having a fixed circumference, adjustable to the size of the dog's neck, or as a choke collar consisting of a running noose adapted to constrict about the neck when the dog exerts tension thereon, consisting of a length of linked chain having a ring at each end thereof through either of which the chain may be slidably extended to form a noose, the chain portion extending beyond the ring forming the noose eye being selectively redoubled on itself and securable to itself, or extended freely, the usual leash being engaged in the eye ring in the first case, and in the ring at the free end of the chain in the second case.

3 Claims, 6 Drawing Figures

PATENTED MAR 25 1975 3,872,833
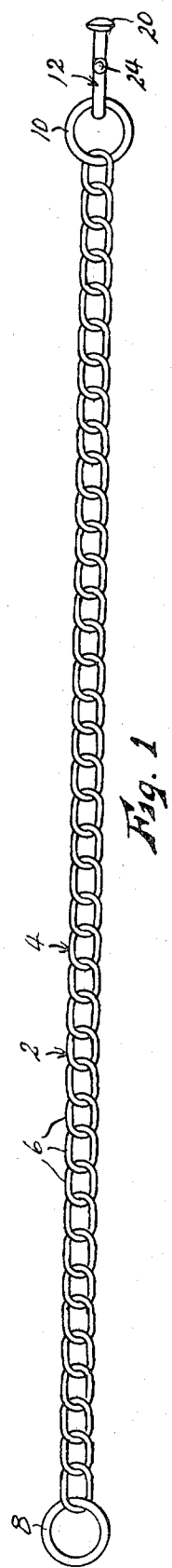
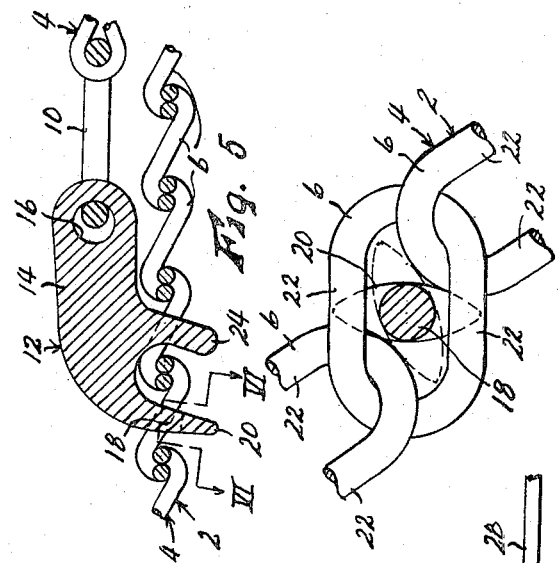
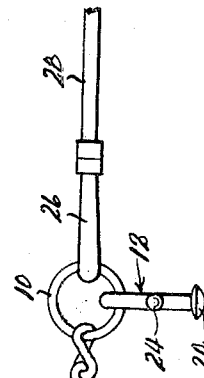
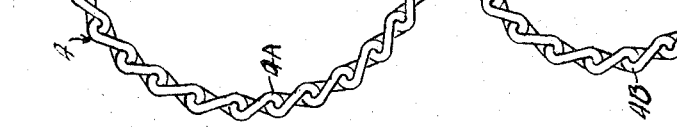
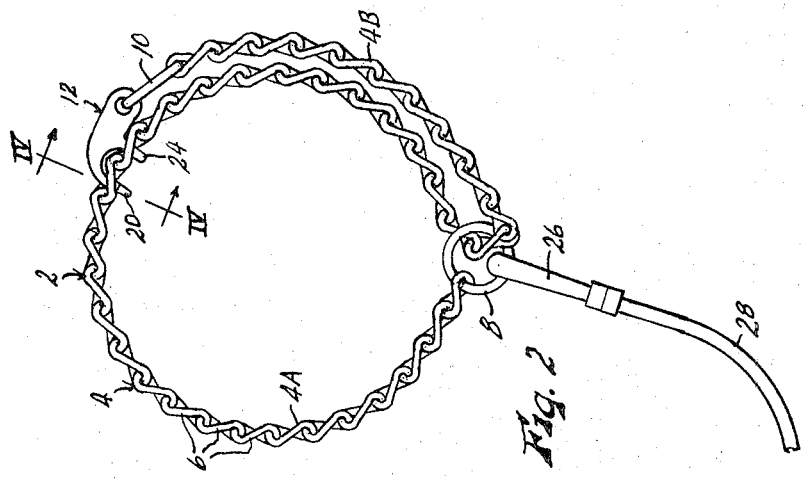

DOG COLLAR

This invention relates to new and useful improvements in dog collars, and has as its principal object the provision of a device which may be used selectively either as a standard collar, which is a loop having a fixed circumference comfortable for the dog, and which ordinances in most localities require nearly all dogs to wear, or as a choke collar, which is a running noose worn about the dog's neck too the free end of which the usual leash is attached, so that force exerted on the leash tends to constrict the noose and choke the dog. The choke collar is used primarily as a disciplining and training device.

Another object is the provision of a dog collar of the character described which, in use as a standard collar, may be easily adjusted to fit a dog of any size, or to fit a single dog from puppyhood to full maturity, but which nevertheless will at no time present freely extending or dangling end portions which could become caught or entangled with anything to cause injury or death to the dog.

To these ends, the dog collar contemplated by my invention consists of a single length of flexible material, preferably a linked chain, having a ring at each end thereof through one of which the chain may be slidably trained to constitute a running noose, the ring at the extended free end of the chain then being engageable by a leash to constitute the device as a choke collar, the portion of the chain extended through the ring forming the eye of the noose being alternatively redoubled along itself, and having at its extended end a novel fastener securely engageable in any desired link of the loop portion of the chain, whereby to constitute the device as a standard collar of any desired circumference. The usual leash is then engaged in the eye ring.

Other objects are simplicity and economy of construction, and efficiency and dependability of operation.

With these objects in view, as well as other objects which will appear in the course of the specification, reference will be had to the accompanying drawing, wherein:

FIG. 1 is a stretched-out side view of a dog collar embodying the present invention, FIG. 2 is a view of the collar arranged to serve as a standard collar, with a leash attached thereto, FIG. 3 is a view of the collar arranged to serve as a choke collar, with a leash attached thereto, FIG. 4 is an enlarged sectional view taken on line IV—IV of FIG. 2, FIG. 5 is a fragmentary sectional view taken on line V—V of FIG. 4, and FIG. 6 is an enlarged fragmentary sectional view taken on line VI—VI of FIG. 5, with the chain left in elevation, showing the fastener fully engaged in solid lines, and in a position preparatory to engagement or disengagement in dotted lines.

Like reference numerals apply to similar parts throughout the several views, and the numeral 2 applies generally to a dog collar embodying the present invention. It consists of a length of chain 4 comprising a series of pivotally interengaged open links 6, and is of appropriate length. Pivoted freely in the respective end links of the chain are open circular rings 8 and 10. For convenience, ring 8 may be further designated as the "eye" ring, and ring 10 as the "end" ring. The rings are identical, and each is of sufficient internal diameter that the chain may pass slidably therethrough.

Also pivoted freely on end ring 10 is a fastener designated generally by the numeral 12, which includes an elongated body member 14 having at one end a hole 16 in which end ring 10 is freely engaged, and at its opposite end a transversely extending finger 18 adapted to be extended through the opening of any link 6 of the chain. The extended end of finger 18 is provided with a transverse T-head 20, said head extending transversely to both body member 14 and also to finger 18. It will be seen in FIG. 6 that each link 6 has essentially parallel side arms 22, or which at least appear parallel in face view as shown, and that the spacing between said side arms is less than the internal length of the link. The length of T-head 20, transversely of finger 18, is less than the internal length of a link, but greater than the spacing between side arms 22, and also greater than the distance between the ends of the two adjoining links engaged in the link through which finger 18 is inserted. Therefore, to insert fastener finger 18 through a link, finger 18 must be turned axially to dispose head 20 thereof generally longitudinally of the link, and the adjoining links must be disaligned as shown. The link will then present an opening through which head 20 may be passed. When the chain links are again aligned by tension of the chain, and body member 14 of the fastener also aligned with the chain, the link through which finger 18 has been passed will not present an opening large enough in any direction to permit the escape of head 20. Body member 14 is provided with a second finger 24 extending generally parallel to but spaced apart from finger 18, and adapted to be inserted, by rocking movement of the fastener, through the chain link next adjoining that in which finger 18 is disposed, after finger 18 is inserted. Thus, disengagement of the fastener requires first a slackening of the chain to permit outward tilting of the fastener to disengage finger 24, second a rotation of the fastener about the axis of finger 18 to align head 20 longitudinally of its link, and third a disarrangement of the adjoining links as shown in FIG. 6. It will therefore be readily appreciated that once the fastener is engaged, accidental disengagement thereof is virtually impossible.

In use, an intermediate portion of chain 4 is trained through eye ring 8. This may be done, despite the fact that neither ring can be passed through the other, by simply reversing a portion of the chain adjacent ring 8 through said ring. Then, if the collar is to be placed in standard use having a fixed circumference, the chain is moved through ring 8 until the portion thereof between its point of attachment to said ring and the point thereof passing slidably through said ring, further designated as loop portion 4A of the chain, constitutes a loop sized to fit the dog's neck comfortably, and the portion of the chain extended beyond ring 8, further designated as chain end portion 4B, is doubled back along loop portion 4A and fastener 12 is engaged in the appropriate link 6 of the loop portion as previously described. The snap fastener 26 of the usual leash 28 may then be engaged in ring 8. In this use, the collar circumference remains constant and will not constrict about the dog's neck no matter how much force he may exert on the leash. It may readily be adjusted to fit a dog of any size, or to fit a single dog from infancy to full maturity, simply by properly selecting the chain link in which to engage fastener 12. It may be worn constantly, being firmly secured to the dog's neck even when no leash is attached thereto, and can carry the usual name, license and immunization notices commonly required. Despite its adjustability as to size, no portion thereof ever hangs free from the dog's neck so that it could by accident catch on some object the dog might pass to cause injury or death to the dog.

When it is desired to use the device as a choke collar, fastener 12 is simply detached from chain loop portion 4A, and leash 28 disconnected from ring 8 and connected into ring 10, as shown in FIG. 3. Loop portion 4A of the chain then constitutes a running noose, which will constrict about the dog's neck responsively to force exerted on the leash 28 by the dog, causing him discomfort which he learns to alleviate by relaxing his pull on the leash. The choke device is used for training and disciplinary reasons, and ordinarily for no other reason. To avoid possible injury to the dog, the collar is used in its choking function as shown in FIG. 3 only when the dog is on a leash controlled by a handler. At all other times, the collar is returned to its FIG. 2 arrangement.

The rearrangement of the collar from the FIG. 3 to the FIG. 2 arrangement, or vice versa, can be accomplished very easily and rapidly, without use of tools of any kind.

While I have shown and described a specific embodiment of my invention, it will be readily apparent that many minor changes of structure and operation could be made without departing from the spirit of the invention.

What I claim as new and desire to protect by Letters Patent is:

1. A dog collar comprising:
   a. an elongated flexible chain, each of the links of said chain being open, the opening thereof having a transverse width less than the longitudinal length thereof, relative to said chain,
   b. an eye member attached to one end of said chain, through which an intermediate portion of said chain is slidably trained to constitute said chain as a running noose having a loop portion and an end portion extended through said eye member, a leash being attachable selectively to either end of said chain, said extended end portion of said chain being capable of being doubled back along the loop portion of said chain, and
   c. fastening means operable to secure said extended chain portion releasably to said loop portion, said fastener including a rigid, elongated body member attached loosely at one end to said chain, and having at its opposite end a finger extending transversely therefrom for insertion through a link of said chain, said finger being affixed to and projecting laterally from said body member, and said finger having at its free end a T-head transverse to said finger and to said body member, the width of said head, in a direction parallel to said body member, being less than the transverse width of said link opening and the length thereof, in a direction transverse to said body member, being greater than the transverse width of the link opening, but less than the longitudinal length of said link opening.

2. A dog collar as recited in claim 1 wherein the length of said T-head is greater than the distance between the confronting ends of the two adjoining links engaged in the link through which said finger is inserted, whereby said adjoining links must be moved to an abnormal position relative to the link through which said finger is to be inserted to permit said insertion.

3. A dog collar as recited in claim 1 wherein the body member of said fastener is provided with a second finger projecting laterally therefrom generally parallel with the previously recited first finger, said second finger being spaced apart from said first finger, longitudinally of said body member, so as to enter the chain link next adjacent the link in which said first finger is engaged, but having no head or other enlargement at its free end.

* * * * *